United States Patent
Castagna et al.

(10) Patent No.: US 7,677,812 B2
(45) Date of Patent: Mar. 16, 2010

(54) STRAIN RELIEF BOOT FOR CABLE CONNECTOR

(75) Inventors: Lou Castagna, Middletown, PA (US); Michael L. Gurreri, York, PA (US); Michael Aaron Kadar-Kallen, Harrisburg, PA (US); David Cormany, Dauphin, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 11/461,258

(22) Filed: Jul. 31, 2006

(65) Prior Publication Data
US 2008/0025670 A1    Jan. 31, 2008

(51) Int. Cl.
*G02B 6/38* (2006.01)
(52) U.S. Cl. .......................................... 385/69; 385/76
(58) Field of Classification Search ............... 385/1, 385/39, 52–56, 58–60, 64–67, 76–84, 134–137, 385/95, 109–113, 86–87; 138/120
See application file for complete search history.

(56) References Cited

U.S. PATENT DOCUMENTS

| | | | | |
|---|---|---|---|---|
| 2,727,088 A | * | 12/1955 | La Wall | 174/135 |
| 3,395,244 A | * | 7/1968 | Koehler | 174/135 |
| 3,497,608 A | * | 2/1970 | Elliott et al. | 174/135 |
| 4,392,344 A | * | 7/1983 | Gordon et al. | 59/78.1 |
| 4,718,860 A | * | 1/1988 | Gobets et al. | 439/447 |
| 4,752,099 A | * | 6/1988 | Roos et al. | 296/223 |
| 4,834,487 A | * | 5/1989 | Abendschein et al. | 385/78 |
| 4,871,318 A | * | 10/1989 | Gobets et al. | 439/76.1 |
| 4,904,046 A | * | 2/1990 | Paschke et al. | 385/138 |
| 5,037,175 A | * | 8/1991 | Weber | 385/76 |
| 5,046,764 A | * | 9/1991 | Kimura et al. | 285/154.2 |
| 5,071,219 A | * | 12/1991 | Yurtin et al. | 385/78 |
| 5,094,552 A | * | 3/1992 | Monroe et al. | 385/76 |
| 5,105,819 A | * | 4/1992 | Wollschlager et al. | 600/463 |
| 5,108,350 A | * | 4/1992 | Szpakowski | 474/207 |
| 5,151,962 A | * | 9/1992 | Walker et al. | 385/86 |
| 5,170,452 A | * | 12/1992 | Ott | 385/60 |
| 5,181,267 A | * | 1/1993 | Gerace et al. | 385/86 |
| 5,202,942 A | * | 4/1993 | Collins et al. | 385/87 |
| 5,214,732 A | * | 5/1993 | Beard et al. | 385/78 |

(Continued)

FOREIGN PATENT DOCUMENTS

EP    0 188 041    7/1986

(Continued)

*Primary Examiner*—Frank G Font
*Assistant Examiner*—Peter Radkowski (57) ABSTRACT

A strain relief boot for a connectorized cable. The boot has a staged bending characteristic in that there are discrete first and second zones that have different bending and minimum bend radius characteristics. The boot is of a segmented design including multiple links separated from one another by open gaps that are spaced from one another in a longitudinal direction. Gaps are positioned along a periphery of the boot for each axial location. Ribs extend longitudinally to connect axially adjacent links, and to separate peripherally spaced gaps. The different characteristics relate to differences in the gap, link and rib structures, which have dimensions varying along the boot's length. Preferably, link and rib dimensions are relatively smaller toward a proximal end of the boot, and gap dimensions are relatively larger toward the proximal end of the boot. This provides greater flexibility and smaller minimum bend radii toward the boot's proximal end.

32 Claims, 7 Drawing Sheets

U.S. PATENT DOCUMENTS

| | | | | |
|---|---|---|---|---|
| 5,220,779 | A | * | 6/1993 | Tatsuta et al. ............... 59/78.1 |
| 5,261,019 | A | * | 11/1993 | Beard et al. .................... 385/60 |
| 5,340,330 | A | * | 8/1994 | Dolson et al. ............... 439/447 |
| 5,390,272 | A | * | 2/1995 | Repta et al. ................. 385/100 |
| 5,425,120 | A | | 6/1995 | Peterson et al. |
| 5,461,690 | A | | 10/1995 | Lampert ..................... 385/100 |
| 5,473,723 | A | * | 12/1995 | Stockman et al. ........... 385/134 |
| 5,620,335 | A | * | 4/1997 | Siemon ....................... 439/491 |
| 5,638,474 | A | | 6/1997 | Lampert et al. ............... 385/78 |
| 5,710,851 | A | * | 1/1998 | Walter et al. .................. 385/86 |
| 5,857,046 | A | | 1/1999 | Barkus et al. |
| 5,915,056 | A | * | 6/1999 | Bradley et al. ................ 385/76 |
| 5,933,557 | A | * | 8/1999 | Ott ............................... 385/86 |
| 5,953,476 | A | * | 9/1999 | Abe .............................. 385/87 |
| 5,963,692 | A | * | 10/1999 | Marazzi et al. ............... 385/80 |
| 6,027,352 | A | * | 2/2000 | Byrne ......................... 439/215 |
| 6,039,081 | A | * | 3/2000 | Albert ......................... 138/120 |
| 6,065,278 | A | * | 5/2000 | Weber et al. ................ 59/78.1 |
| 6,068,506 | A | * | 5/2000 | Shen ........................... 439/447 |
| 6,134,370 | A | * | 10/2000 | Childers et al. ............. 385/135 |
| 6,156,974 | A | * | 12/2000 | Blase ......................... 174/68.3 |
| 6,318,063 | B1 | * | 11/2001 | Komiya et al. ............... 59/78.1 |
| 6,494,496 | B1 | * | 12/2002 | Sweeney ..................... 285/115 |
| 6,550,232 | B1 | * | 4/2003 | Achs et al. ................... 59/78.1 |
| 6,554,489 | B2 | | 4/2003 | Kent et al. ..................... 385/86 |
| 6,565,262 | B2 | | 5/2003 | Childers et al. ............... 385/76 |
| 6,634,801 | B1 | * | 10/2003 | Waldron et al. ............... 385/86 |
| 6,749,560 | B1 | * | 6/2004 | Konstorum et al. ......... 600/143 |
| 6,858,005 | B2 | * | 2/2005 | Ohline et al. ............... 600/141 |
| 6,916,062 | B2 | * | 7/2005 | Suzuki et al. ............... 296/155 |
| 6,940,019 | B2 | * | 9/2005 | Ikeda et al. ................. 174/68.3 |
| 6,941,974 | B2 | * | 9/2005 | Utaki .......................... 138/120 |
| 7,001,081 | B2 | | 2/2006 | Cox et al. ...................... 385/86 |
| 7,045,705 | B2 | * | 5/2006 | Ikeda et al. ................. 174/21 R |
| 7,174,702 | B2 | * | 2/2007 | Ikeda et al. ................. 59/78.1 |
| 7,288,000 | B2 | * | 10/2007 | Liu et al. ..................... 439/447 |
| 2003/0039453 | A1 | * | 2/2003 | Holmquist et al. ............ 385/86 |
| 2003/0108303 | A1 | * | 6/2003 | Asada .......................... 385/86 |
| 2003/0185522 | A1 | * | 10/2003 | Young et al. .................. 385/86 |
| 2004/0234209 | A1 | * | 11/2004 | Cox et al. ...................... 385/86 |
| 2005/0029393 | A1 | * | 2/2005 | Ikeda et al. ................. 242/615.3 |
| 2005/0056333 | A1 | * | 3/2005 | Utaki .......................... 138/120 |
| 2005/0103512 | A1 | * | 5/2005 | Ikeda et al. ................... 174/19 |
| 2005/0273085 | A1 | * | 12/2005 | Hinman et al. ................. 606/1 |
| 2007/0151225 | A1 | * | 7/2007 | Ikeda et al. ................. 59/78.1 |

FOREIGN PATENT DOCUMENTS

WO      WO 93/09457      5/1993

* cited by examiner

STRAIN RELIEF BOOT FOR CABLE CONNECTOR

FIELD OF THE INVENTION

The present invention relates generally to strain relief for cables, and more particularly to a strain relief boot for a fiber optic or other cable and/or connector.

DISCUSSION OF RELATED ART

Cables, including optical fibers, are commonly used in a variety of applications, including telecommunications applications. The fibers may be terminated to any of a variety of different connectors, such as LC, FC, MU, SC and ST type connectors. Such connectors are used to join fibers to active or passive optical components such as sources, detectors, repeaters, switches, attenuators, etc.

Cables may be subject to excessive bending when side loads are placed on the cable. It is well known in the art that particular care is taken in fiber optic cable applications not to violate a minimum bend radius of the cable. Excessive bending of the fiber negatively impacts the transmission characteristics of the fiber and degrades optical performance. Such loads are often relieved by a strain relief device in the form of a flexible boot, which can be used to limit the bend radius to prevent or limit excessive bending and related degradation of optical performance.

Various strain relief devices for fiber optic cables and/or connectors are known in the art. U.S. Pat. No. 5,390,272 to Repta et al. discloses an exemplary strain relief boot of a segmented design that includes an overlapping, alternately positioned, staggered series of cut openings 25, alternate ones of which define a series of ribs 26 each including a transverse opening 25, alternate ribs being bendable in transverse directions. The ribs 26 are spaced apart by connecting portions 27 defined by openings 25. The ribs 26, cut openings 25 and connecting portions 27 each have a respective uniform width along the axial direction of the boot.

While some strain relief devices and/or connectors may be suitable for certain applications, e.g. where there is ample environmental space, they are unsuitable for applications in which space is limited. For example, optical equipment is often mounted in a telecommunications cabinet having a hinged cover. Due to the combined length of existing strain relief devices and connectors, there is sometimes insufficient clearance space between a front face of the components and an inside face of the cover when the cover is closed. As a result, the cover cannot be closed, or optical performance is degraded as the closed cover impinges upon the strain relief devices and causes bending of the fiber/strain relief device.

What is needed is a strain relief device that is capable of enduring a wide range of side loads, e.g. 0-3 pounds, and limiting the cable bend radius to prevent undesirable degradation of optical performance of a corresponding fiber optic cable.

SUMMARY OF THE INVENTION

An embodiment of the present invention provides a strain relief boot that is capable of enduring a wide range of side loads, e.g. 0-3 pounds, and that limits a cable bend radius, e.g. to prevent undesirable degradation of optical performance of a corresponding fiber optic cable. The strain relief boot is constructed to provide a staged bending characteristic in that there is a first discrete zone configured to bend at lower side loads, and a second discrete zone configured to bend at higher side loads. Preferably, each zone has a different minimum bend radius. A connector assembly, such as a fiber optic connector assembly, including such a strain relief boot is provided also.

The strain relief boot is of a segmented design including multiple links separated from one another by open gaps that are spaced from one another in a longitudinal direction. Preferably, several gaps are peripherally spaced along a perimeter of the boot for a plurality of axial locations. Ribs extend longitudinally to connect axially adjacent links, and to separate peripherally spaced gaps.

Differences in bending characteristics and bend radii among the zones are due at least in part to structural differences in the structure of the boot along the boot's longitudinal direction. Such structural differences may include one or more of differences in widths of the gaps in the longitudinal direction, differences in widths of links in the longitudinal direction, and/or differences in lengths of connecting ribs in a peripheral direction extending around the boot.

The dimensions of the links, gaps and/or ribs vary along the longitudinal direction of the boot. Preferably, link and rib dimensions are relatively smaller toward a proximal end (cable end) of the boot and relatively larger toward a distal end (connector end) of the boot, and gap dimensions are relatively larger toward the proximal end of the boot and relatively smaller toward the distal end of the boot. A link, gap or rib at one axial location may have dimensions identical to a respective link, gap or rib at another axial location. Alternatively, all links, all gaps, or all ribs may have unique respective dimensions.

The bending characteristics of the boot include a first stage in which lighter loads result primarily in bending in a proximal portion of the boot, and a second stage in which heavier loads result in subsequent bending in a distal portion of the boot.

Preferably, the links are annular in overall shape and smaller in overall size toward the proximal end of the boot, and the gaps and ribs are arranged symmetrically about the boot to provide approximate rotational symmetry to the bending characteristics of the boot, and to the light transmittance characteristics of an optical fiber to which the boot has been joined.

BRIEF DESCRIPTION OF THE DRAWINGS

The present invention will now be described by way of example with reference to the following drawings in which.

DETAILED DESCRIPTION

An embodiment of the present invention provides a segmented strain relief boot that is capable of enduring a wide range of side loads, e.g. 0-3 pounds, and that limits a cable bend radius, e.g. to prevent undesirable degradation of optical performance of a corresponding fiber optic cable. More specifically, the strain relief boot provides a staged bending characteristic in that there is a first discrete zone configured to bends at lower side loads, and a second discrete zone configured to bend at higher side loads. Preferably, each zone has a different minimum bend radius. A cable connector assembly including such a strain relief boot is provided also.

Referring now to FIGS. 1-4, an exemplary fiber optic cable assembly 10 is shown that includes a connector 20 for connecting a cable to a receptacle, and an exemplary strain relief boot 30 in accordance with the present invention. In this exemplary embodiment, the connector 20 is an LC style fiber optic connector. The exemplary LC connector is representative of other fiber optic connectors in that it includes a connector body 22 having a termination portion 24 to which an optical fiber (cable) 6 is terminated and enclosed in a crimp eyelet and/or heat shrink tubing 26 according to conventional fiber termination and connectorization methods that are well known in the art. However, it will be appreciated that the strain relief boot 30 may be used with and/or configured for use with any suitable fiber optic connector, such as LC, FC, MU, SC and ST style connectors.

Additionally, it will be appreciated by those skilled in the art that the strain relief boot may be adapted for mating with connectors and cables in other than fiber optic applications for general strain relief, although adherence to bend radius limits may not be as critical in such other applications.

Figure 4:
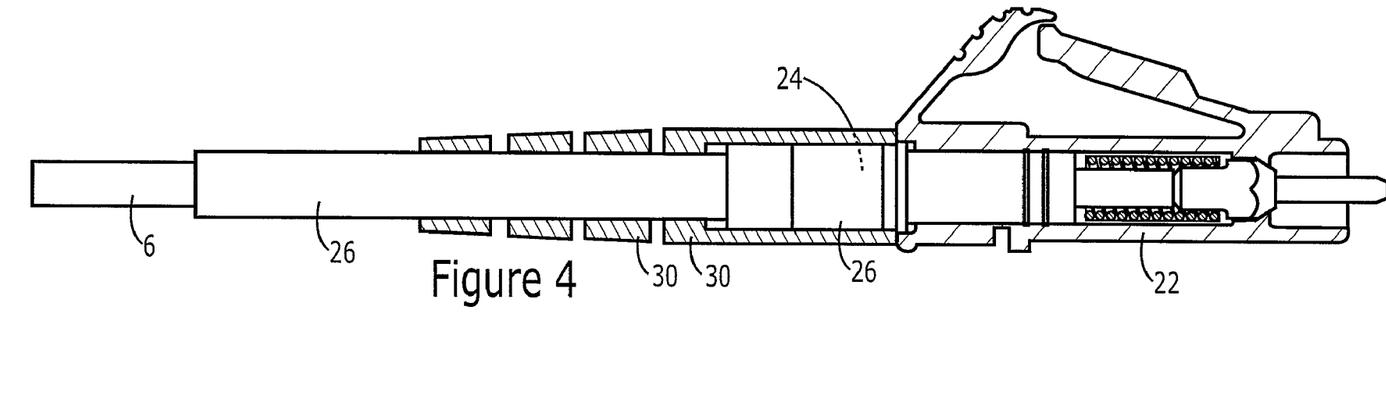
FIG. 4 is a cross sectional view of the fiber optic cable assembly of claim 1, taken along line A-A of FIG. 2.

As is conventional for strain relief boots, the exemplary strain relief boot 30 fits over a junction of the connector 20 and cable 6, and is fixedly attached to the connector 20 adjacent its termination portion 24, e.g. by interference fit or adhesive bonding to the crimp eyelet/heat shrink assembly 14 that is fixed to the connector 20 body 22, as shown in FIG. 4. Further, the strain relief boot may be constructed of conventional materials, such as polypropylene, using conventional manufacturing methods, such as a conventional injection molding process.

Referring now to FIGS. 5-8, enlarged views of an exemplary strain relief boot 30 are shown. As shown in FIGS. 5-8, the exemplary boot 30 includes an elongated sleeve member 32 defining a central channel 34 extending along a longitudinal axis Z of the sleeve member. The channel 34 is dimensioned to receive a cable, such as a clad optical fiber cladding, etc., so that the boot 30 may be passed over and enclose the cable and be mounted to a connector, as is typical of strain relief boots.

The sleeve 30 includes a relatively flexible bend limiting portion 36 and a relatively less flexible mounting portion 38. The mounting portion 38 is used to mount the boot 30, i.e. a distal portion of the sleeve member, to the connector 20 by interference/friction fit, adhesion, etc., as discussed above.

The bend limiting portion 36 includes multiple links 40, which are separated from one another by gaps 42, which are openings in the structure of the sleeve 30. Such openings may be formed during manufacture, e.g. injection molding, of the sleeve 30. The gaps 42 are spaced from one another in a direction of the longitudinal axis Z, and thus define the links 40 between them. Preferably, each of the links is generally annular in cross-sectional shape, as shown in FIGS. 1-15. This contributes to rotational symmetry of the strain relief boot, as discussed in greater detail below. However, alternative shapes may be used, as will be appreciated by those skilled in the art.

Figure 5:
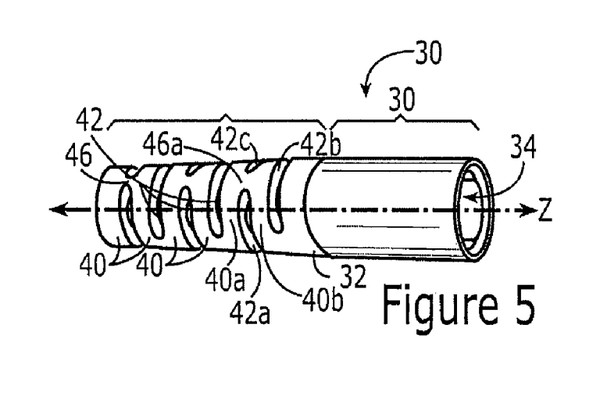
FIG. 5 is an enlarged perspective view of the strain relief boot of FIG. 1

In the longitudinal direction, adjacent ones of the gaps 42 are preferably oriented transversely to one another. For example, the gaps may be positioned at distinct peripheral, e.g. circumferential, positions separated by a predefined angular interval relative to the longitudinal axis Z. In the exemplary embodiment shown, for example, gaps 42a and 42b, and others of the gaps, are positioned at a regular angular interval of 90 degrees between axially adjacent gaps, as best shown in FIG. 5. This configuration contributes to rotational symmetry of the boot 30.

Preferably, several gaps are positioned along a perimeter of the sleeve member 30 for each axial location, as shown in FIGS. 5-8. For example, there are two gaps, 42a, 42c positioned along the perimeter of the sleeve between axially adjacent links 44a, 44b, as shown in FIG. 5. Accordingly, the bend limiting portion 36 of the sleeve member 30 includes ribs 46 extending in the direction of the longitudinal axis to connect adjacent links. For example, rib 46a connects links 40a and 40b, and is defined between gaps 42a, 42c, as shown in FIG. 5.

Figure 6:
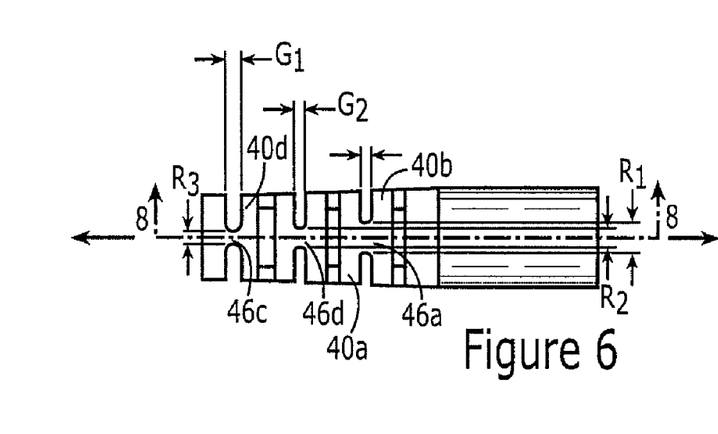
FIG. 6 is an enlarged side view of the strain relief boot of FIG. 1.
Figure 7:
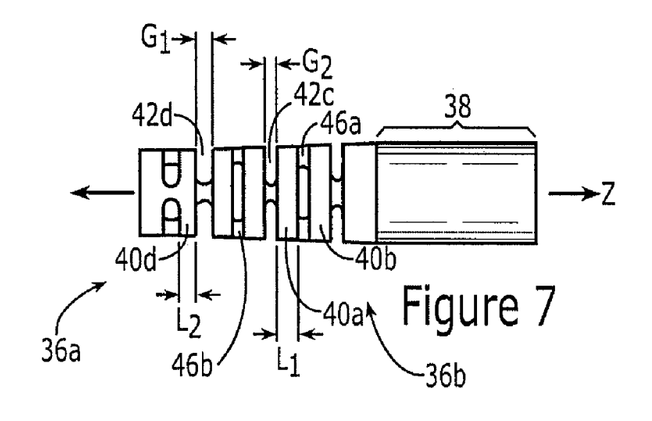
FIG. 7 is an enlarged top view of the strain relief boot of FIG. 1.
Figure 8:
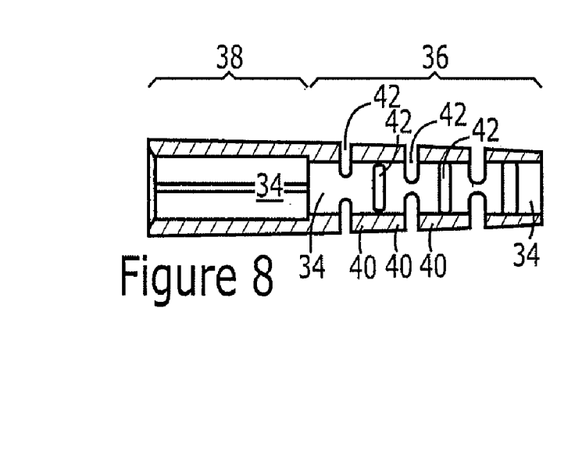
FIG. 8 is a cross-sectional view of the strain relief boot of FIG. 1, taken along line B-B of FIG. 6.

Preferably, there is a respective pair of ribs, e.g. 46a, 46b, extending in opposed positions about the sleeve member 30 between adjacent links, e.g. 40a, 40b, as best shown in FIGS. 6 and 7. The ribs, e.g. 46a, 46b, on axially opposite sides of each link are preferably positioned at distinct peripheral positions separated by a predefined angular interval, e.g. 180 degrees as shown in FIGS. 5-8. This configuration contributes to a rotational symmetry of the boot 30, as discussed in greater detail below.

As discussed above, the strain relief boot 30 provides a staged bending characteristic in that there is a first discrete zone configured to bends at lower side loads, and a second discrete zone configured to bend at higher side loads. Preferably, each zone has a different minimum bend radius. Differences in bending characteristics and bend radii among the zones are due at least in part to structural differences in the sleeve. Such structural differences may include one or more of differences in widths of the gaps in the longitudinal direction, differences in widths of links in the longitudinal direction, differences in lengths of connecting ribs in a peripheral direction, and/or differences in outside diameter of the boot due to taper.

Referring now to FIGS. 6 and 7, exemplary structural differences are described for illustrative purposes. As described above, each of the gaps 42 has a respective width in the direction of the longitudinal axis Z. In the exemplary embodiment, a first gap has a width $G_1$ that is greater than a second width $G_2$ of a second gap. For example, $G_1$ may be 0.8 mm, and $G_2$ may be 0.6 mm. Preferably, the second gap 42c is closer to the sleeve member's mounting portion 38 than the first gap 42d, as shown in FIG. 7. Accordingly, a proximal end portion 36a of the bend limiting portion 36 will be more flexible than a distal end portion 36b of the bend limiting portion 36. As the boot starts to bend it is relatively more flexible due to the presence of relative large gaps between links. This flexibility is sustained until the gaps of smaller widths, G2, start to close, at which time the boot becomes less flexible and limits the radius of the bend to a desired minimum. Gaps of larger width, G1 may not close under any side load condition, therefore the boot portion at that end remains flexible. This is especially useful for lower loads for which the flexible links at the proximal end smooth the boot to cable transition, avoiding a sharp bend radius.

Further, having larger gaps 42 between links 40 toward a proximal end portion 36a than a distal end portion 36b of the bend limiting portion 36 permits a sharper bend of the strain relief boot, i.e. a smaller minimum bend radius for the boot, in the region of larger gaps 42. This is due to the geometry of the segmented design that allows for bending of the sleeve member 30 until a point at which adjacent links 40 abut one another, at which point further bending between those links essentially ceases; a larger gap between adjacent links allows for more bending (a shorter bend radius) before the adjacent links abut one another. Accordingly, longitudinal segments of links 40 and gaps 42 that have different gap widths will have different respective minimum bend radii.

In the exemplary embodiment, there are additional structural variations that contribute to the staged bending characteristic of the boot 30. As shown in FIGS. 6 and 7, there are links 40a, 40d of the sleeve member 30 that have different widths in the direction of the longitudinal axis Z. For example the width L1 of link 40a is greater than the width L2 of link 40d. For example, L1 may be 1.2 mm and L2 may be 0.9 mm. A group of narrower links allows a tighter bend, i.e. smaller minimum bend radius, relative to a group of identically spaced wider links. Preferably, the wider link 40a is closer to the sleeve member's mounting portion 38 than the narrower link 40d, as shown in FIG. 7. In such a configuration, a proximal end portion 36a of the bend limiting portion 36 will have a smaller minimum bend radius than the distal end portion 36b. Accordingly, longitudinal segments of links 40 and gaps 42 that have different link widths will have different respective minimum bend radii.

In the exemplary embodiment, there are yet additional structural variations that contribute to the staged bending characteristic of the boot 30. As shown in FIGS. 6 and 7, the sleeve member 30 includes ribs 46 that extend in the direction of the longitudinal axis Z and connect adjacent links 40. Each of the ribs 46 has a respective length along a periphery (e.g., circumferentially) of the sleeve member 30. To vary the bending characteristics along the length of the boot 30, the peripheral length of the ribs may be different at different axial locations along the length of the boot 30. For example, rib 46a may have a length $R_1$ that is greater than a respective length $R_2$ of another rib 46d, as best shown in FIG. 6. Preferably, a rib 46a having a longer length is closer to the sleeve member's mounting portion 38 than a rib 46b having a shorter length, as shown in FIG. 7. In such a configuration, a proximal end portion 36a of the bend limiting portion 36 will be more flexible, i.e. bend under a lower side load, than the distal end portion 36b, in part because the longer ribs include more sleeve material and impart greater stiffness to a corresponding portion of the sleeve member 30. Accordingly, longitudinal segments of the boot 30 that have different rib lengths will have different bend characteristics under side loads.

Figure 9:
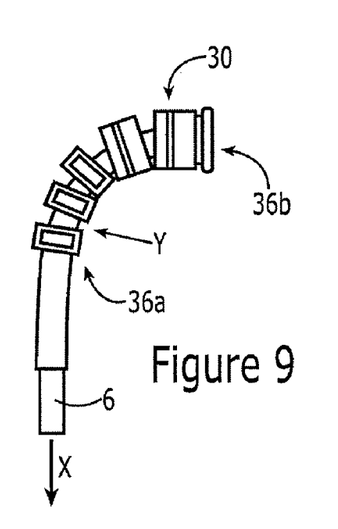
FIG. 9 is a side view of the strain relief boot of FIG. 1 in a high side load state.
Figure 10:
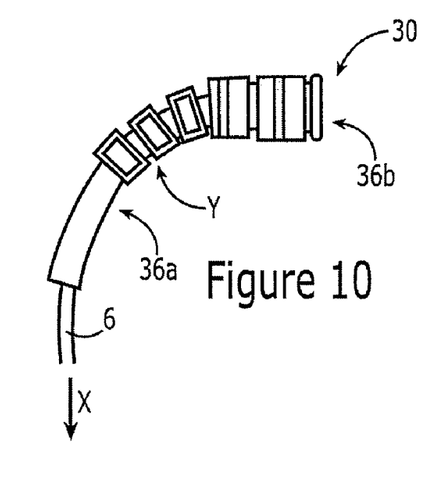
FIG. 10 is a side view of the strain relief boot of FIG. 1 in a low side load state.

FIGS. 9 and 10 are side views of the strain relief boot 30 of FIG. 1 in a high side load (e.g., 2-3 lbf) and low side load (e.g., 0-1 lbf) states, respectively. In both Figures, the side load is applied in the direction X, which is approximately perpendicular to a longitudinal axis of the connector. As shown in FIG. 10, under relatively low side loads, the exemplary strain relief boot 30 bends primarily toward the proximal end portion 36a of the bend limiting portion 36. This is where flexibility is relatively higher due to larger gaps between links, narrower links and/or shorter ribs, relative to those near the distal end portion 36b, as discussed above. The more rigid distal end portion 36b may not, or may only slightly, bend at lower side loads.

As shown in FIG. 9, under relatively higher side loads, the exemplary strain relief boot 30 bends primarily, and/or more significantly, toward the distal end portion 36b of the bend limiting portion 36. This is due, at least in part, to the inability of the relatively more flexible portion of the bend limiting portion 36 to accept the greater load. Note that gaps in the more flexible proximal end portion 36a that are partially closed under a lower load may re-open under higher a load, e.g. as shown at Y in FIGS. 9 and 10. This increases the actual bend radius in the proximal end portion 36a, resulting in a more gradual bend in this region, as the actual bend radius in the distal end portion 36b decreases, resulting in a tighter bend in this region.

Accordingly, the bending characteristics of the boot includes a first stage in which lighter loads result primarily in bending in a proximal portion of the boot, and a second stage in which heavier loads result in subsequent bending in a distal portion of the boot.

Figure 11:
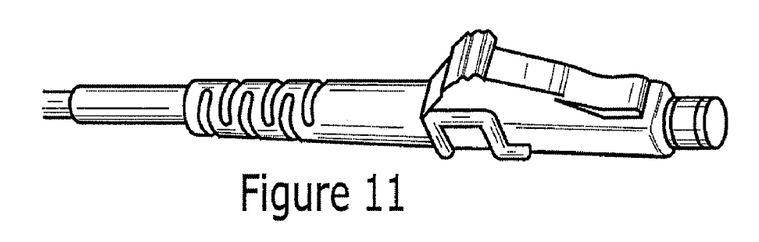
FIG. 11 is a top perspective view of the fiber optic connector of FIGS. 1-4, shown with the strain relief boot in a 0 degree boot orientation.
Figure 12:
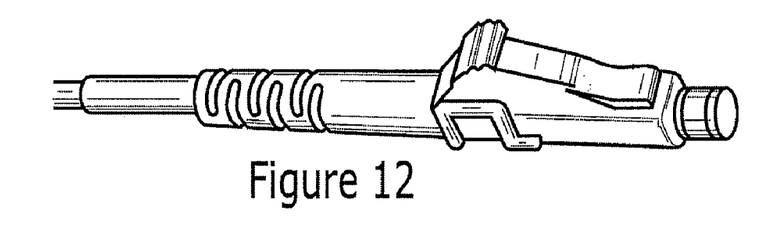
FIG. 12 is a top perspective view of the fiber optic connector of FIGS. 1-4, shown with the strain relief boot in a 90 degree boot orientation.

FIGS. 11 and 12 are top perspective views of the exemplary fiber optic connector of FIGS. 1-4, shown with the strain relief boot in a 0 degree rotational orientation (FIG. 11) and a 90 degree rotational orientation (FIG. 12) relative to a longitudinal axis of the connector. It is noted that there is a like number of links in a plane of a bend of the cable in both the 0 and 90 degree rotational orientations, which means that there is a degree of rotational symmetry to the exemplary boot 30. The rotational symmetry of the boot 30 provides consistent, or substantially similar, bend characteristics and change in internal transmittance (CIT) values.

Furthermore, for boot orientations between 0 and 90 degrees the effective number of gaps activated is increased. While the introduction of more active gaps in the plane of the bend tends to make the boot more flexible, the ultimate flexibility of each gap is also a function of the proximity of the bend plane to the closed end of the gap, which in turn is related to the orientation of the boot. Gaps are most flexible when the boot orientation is close to 0 and 90 degrees, and least flexible when the boot orientation is close to 45 degrees. Furthermore, the number of active gaps is least when the boot orientation is close to 0 and 90 degrees, and most when the boot orientation is close to 45 degrees. Therefore, although the number of active gaps is increased for boot orientations between 0 and 90, each is stiffer, thereby making the overall boot bend characteristics approximately invariant with boot orientation, across a 360 degree range of rotational orientations of the boot 30 relative to the connector 20. This is advantageous because it reduces or eliminates the need for the boot 30 to be oriented in a specific orientation during mounting to a connector 20, and/or the need to predetermine a direction from which loads will be applied to the boot 30.

Further, although there is a different number of links in the same plane of the bend of the cable when the boot is in a 45 degree rotational orientation, the exemplary embodiment provides for a similar bend characteristic due at least in part to relatively less stiffness of a larger number of links, or relatively greater stiffness of a lesser number of links in the plane of the bend.

Further still, the boot allows for adherence to minimum bend radius limitations of optical fibers to ensure adequate optical performance while having an overall shorter length, e.g. approximately 20% shorter overall, from a tip of a connector ferrule to a proximal end of the strain relief boot. In the example of an LC connector, an overall length of 42.5 mm has been achieved, relative to a conventional overall length of 52 mm.

Figure 1:
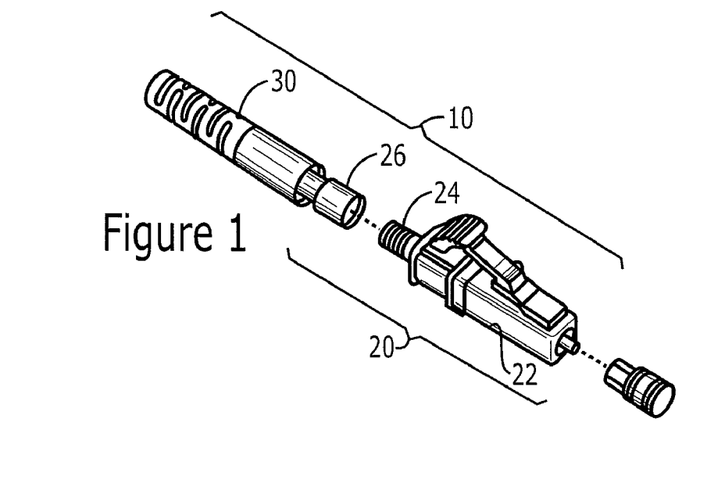
FIG. 1 is an exploded view of an exemplary fiber optic cable assembly including an exemplary strain relief boot in accordance with the present invention.
Figure 2:
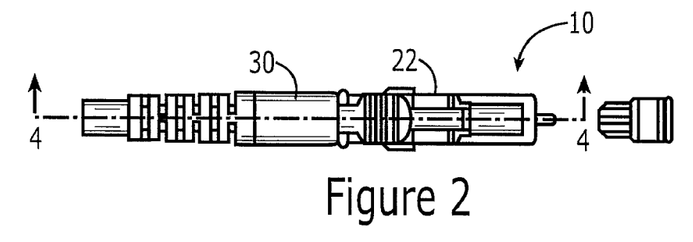
FIGS. 2 and 3 are top and side views of the fiber optic cable assembly of claim 1.
Figure 3:
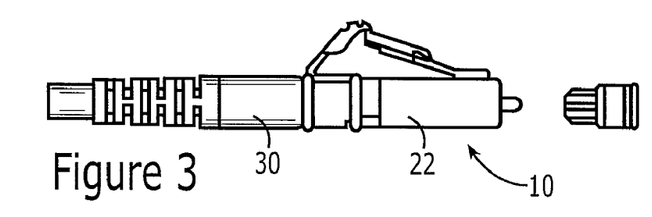

The boots described above generally consist of links separated by gaps. In the embodiments of FIGS. 1-12, the gaps are generally defined between two parallel surfaces of links that are joined by a curved surface. In certain alternative embodiments (see FIGS. 13A-16), portions of the links 40 are contoured, such that each gap 42 has a non-rectangular shape when viewed transversely, i.e. when viewed as shown in FIG. 2 or 3.

Figure 13A:
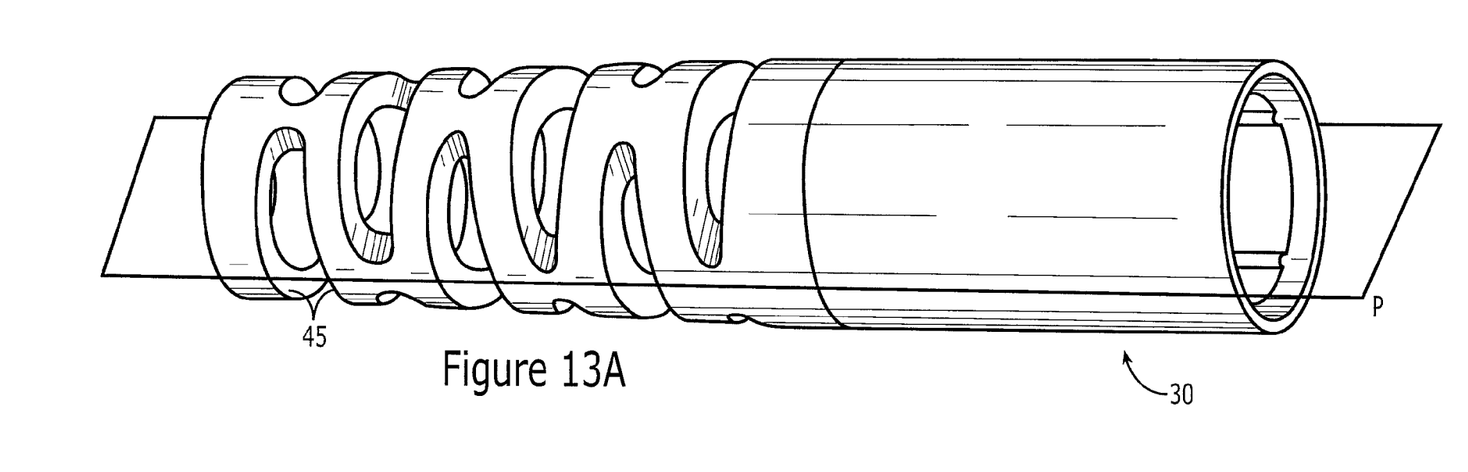
FIGS. 13A and 13B are perspective and side views of an alternative embodiment of a strain relief boot.
Figure 13B:
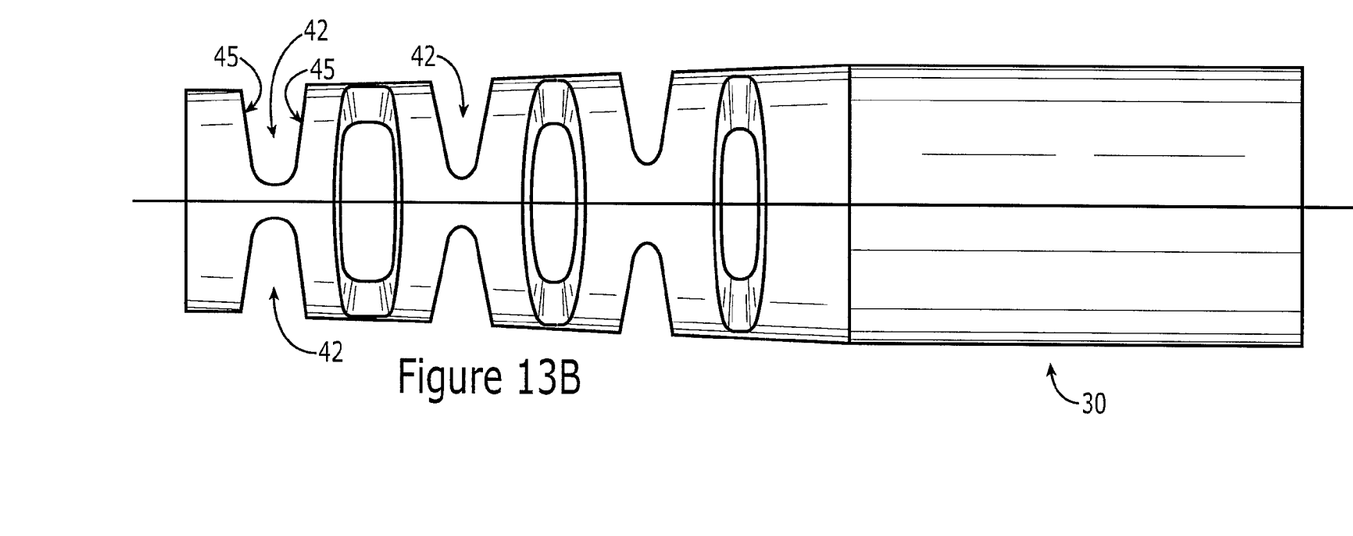

For example, the links may be tapered in the radial direction, such that the gaps 42 between links have either a generally chevron or wedge shape, in which the distal ends of adjacent links are more widely spaced in the longitudinal direction than their proximal ends relative to a reference plane P, as shown in FIGS. 13A and 13B.

Figure 14A:
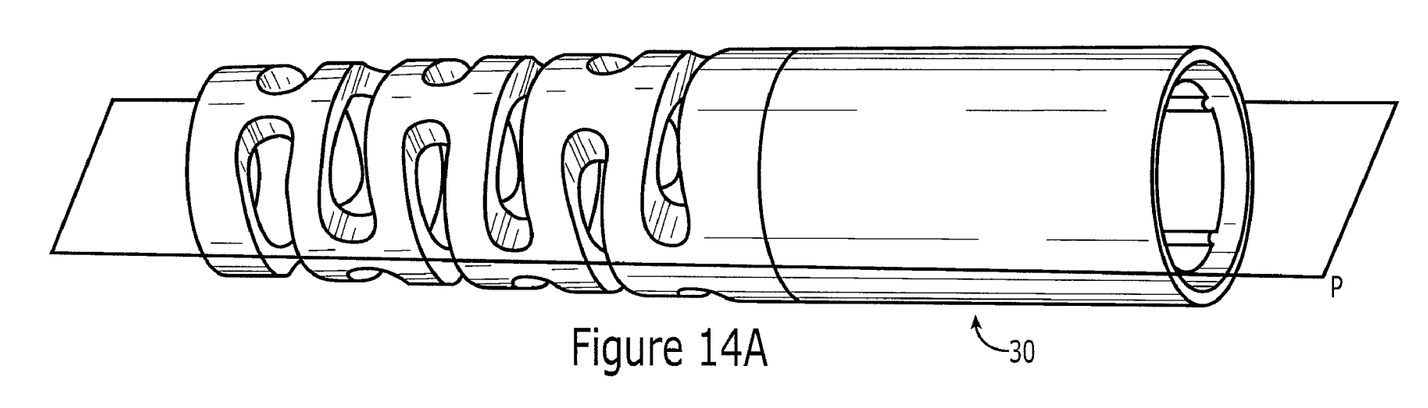
FIGS. 14A and 14B are perspective and side views of another alternative embodiment of a strain relief boot.
Figure 14B:
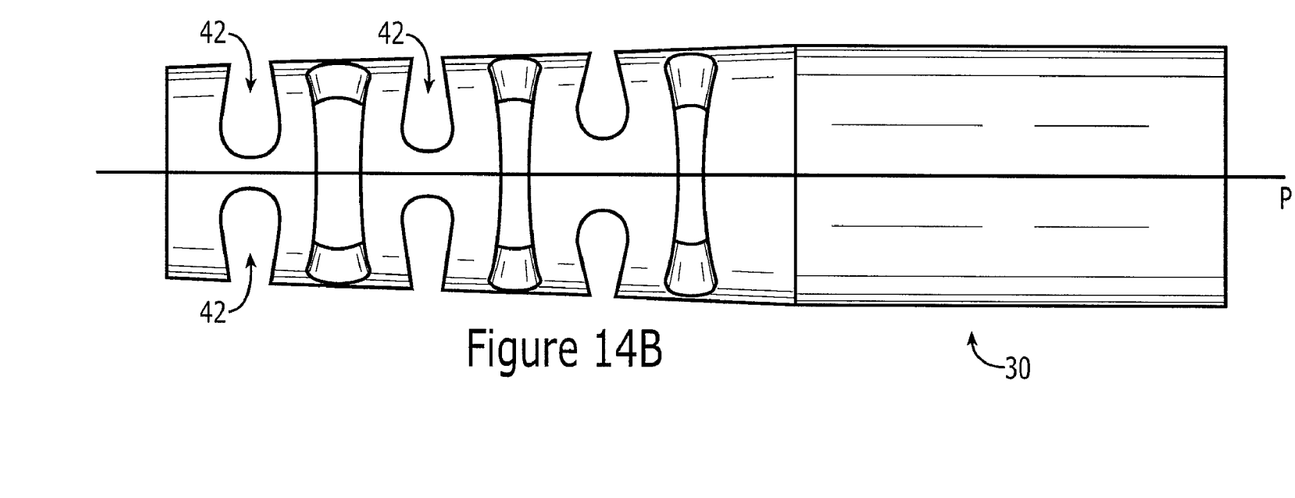

Alternatively, the links may be flared in the radial direction, such that the gaps 42 between links have a generally inverted chevron or inverted wedge shape, in which the distal ends of adjacent links are move closely spaced than their proximal ends relative to a reference plane P, as shown in FIGS. 14A and 14B.

Figure 15A:
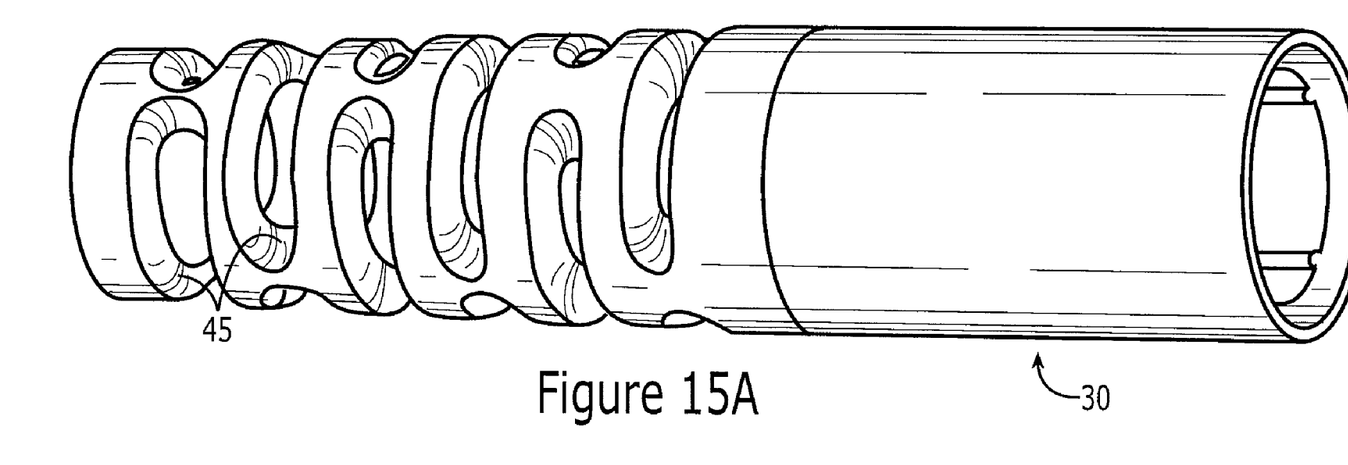
FIGS. 15A and 15B are perspective and side views of another alternative embodiment of a strain relief boot.
Figure 15B:
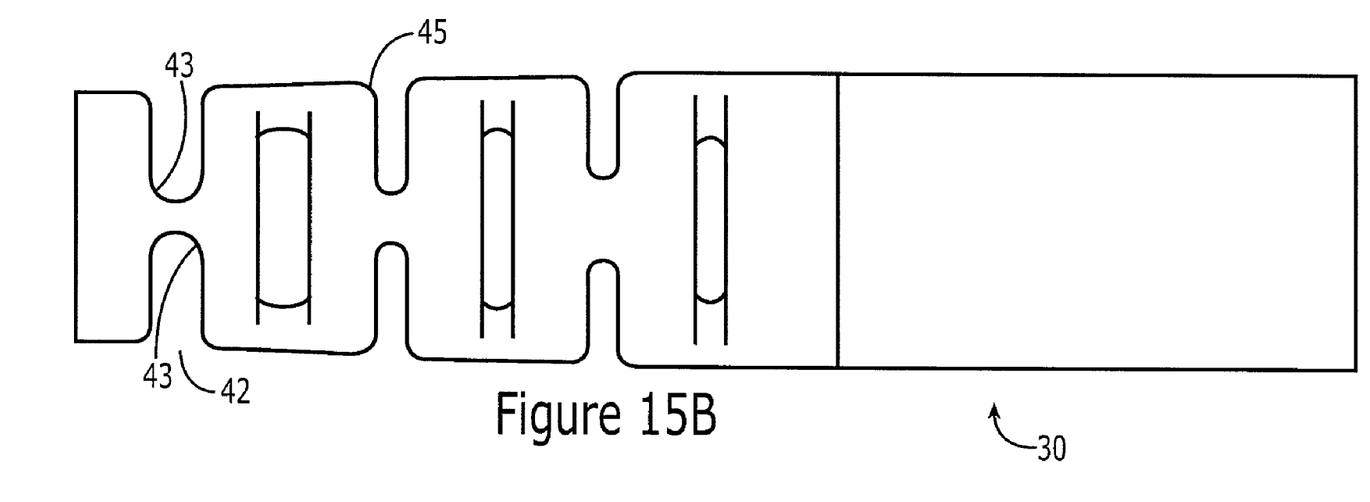

Further, it should be noted that junctions of links, ribs, etc. of any configuration may have rounded, radiused, chamfered, or other eased edges 45 or junctions 43 at which they intersect one another, as shown in FIGS. 15A and 15B. These variations contribute and/or control the bend limits, the overall flexibility of the boot, and the relationship of staged bending in the different zones. Accordingly, these features can be used, combined and/or varied to provide desired the bending characteristics for a particular boot 30.

Figure 16:
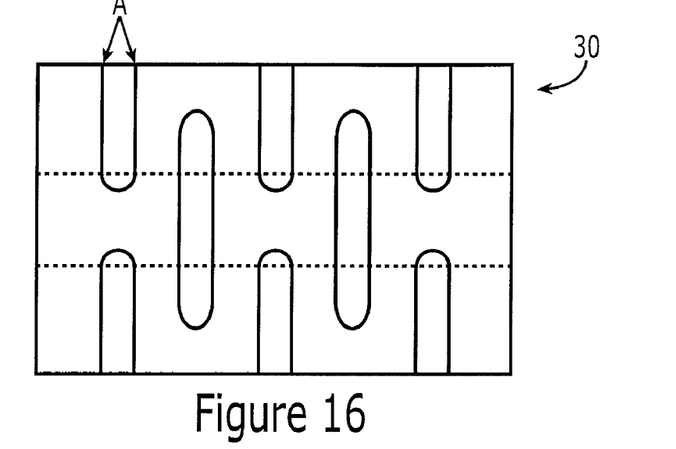
FIGS. 16 and 17 are alternative side views of the strain relief boots of FIGS. 6 and 13B, respectively.
Figure 17:
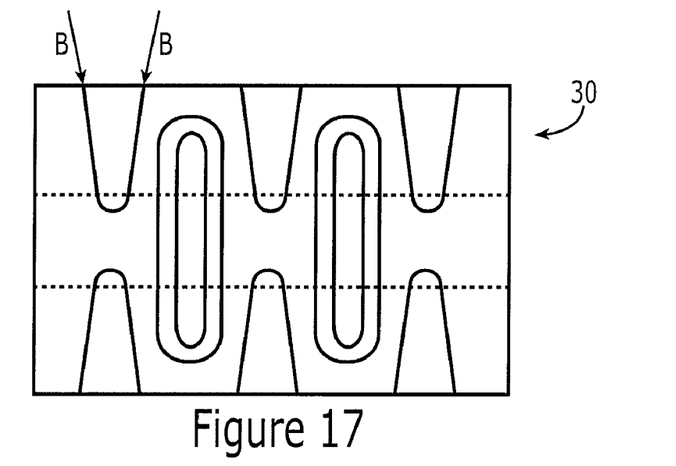

The internal geometry of the boots of FIGS. 1-15B is essentially cylindrical, as best shown in FIGS. 16 and 17. When such boots are bent under high load, the links close at their radially distal ends, with the edges "A" coming in contact to limit the bent shape of the boot, as best shown in FIG. 16. As a result, the internal geometry of the boot 30 in a bent state is essentially a series of adjacent straight segments, which provides a segmented surface.

While this configuration is satisfactory for certain applications, it is noted that if the edges/corners (see A, FIG. 16) have a radius of curvature or other feature that is different from that of the intended design, or that differs from one cavity of the mold to another, then the bent shape of the boot may not conform precisely to design specifications. Accordingly, in an alternative embodiment, the contoured portions of the links are defined so that more than just edges/corners of adjacent links abut one another at or near the bend limit. Instead, substantially planar surfaces are provided for abutting one another at or near the bend limit. Such surfaces can be more reliably provided in an injection molding process, which allows for better conformance to design specifications. For example, the chamfered edge surfaces 45 of FIGS. 15A and 15B abut one another at or near the bend limit, and a substantial portion of the opposing substantially planar link surfaces 45 of FIGS. 13A and 13B abut one another at or near the bend limit (see B in FIG. 17). Such embodiments allow for substantially planar surfaces, and not just sharp edges/corners, to abut one another at or near the bend limit. This provides a more solid "stop" for the bending action of the boot, eliminates the sensitivity of the boot design to the shape of the edges "A", and thus may provide a more reliable, more predictable bend limit and bend limit configuration.

Figure 18:
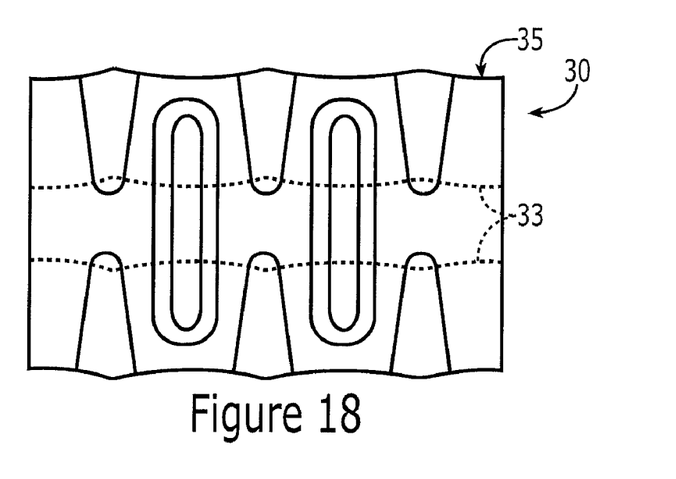
FIG. 18 is a side view of an alternative embodiment of the strain relief boot of FIG. 13B.

Further, the cylindrical internal geometry of FIGS. 1-17, which provides a series of adjacent straight segments differing in slope, might in certain embodiments pose a risk of transmission loss if boot is designed such that the transition from one segment may cause an excessively sharp bend in the fiber when the boot is in its bent shape. Accordingly, an alternative embodiment is provided, as shown in FIG. 18. In this alternative embodiment, the interior surface 33 of the boot defines a series of arcs that, when bent under high load, form a continuous arc. Accordingly, a fiber within the boot 30 follows the smooth curve of the interior surface's continuous arc when the boot is in a bent state, e.g. at its bend limit. Optionally, the external geometry may be such that the boot's external surface 35 defines a series of arcs corresponding to the arc along the interior surface, as shown in FIG. 18. In such an embodiment, the external geometry will also define a continuous arc when the boot is in a bent state, e.g. at its bend limit. This results in a uniform wall thickness for the bent boot.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A strain relief boot for a cable connector comprising:
an elongated sleeve member defining a central channel, said central channel extending along a longitudinal axis and being dimensioned to receive a cable, said sleeve member comprising:
a bend limiting portion and a mounting portion, said bend limiting portion comprising a plurality of links separated by a plurality of gaps spaced in a direction of said longitudinal axis, each of said plurality of gaps having a respective width in the direction of the longitudinal axis, a first gap of said plurality of gaps having a first width that is greater than a second width of a second gap of said plurality of gaps, and a plurality of ribs, each of said ribs extending in the direction of said longitudinal axis to connect adjacent ones of said links, each of said ribs having a length in a circumferential direction of said sleeve member, a first rib of said plurality of ribs having a first circumferential length and a second rib of said plurality of ribs having a second circumferential length different than said first circumferential length.

2. The strain relief boot of claim 1, wherein said second gap is closer to said mounting portion than said first gap.

3. The strain relief boot of claim 1, wherein adjacent ones of said plurality of gaps are oriented transversely to one another.

4. The strain relief boot of claim 3, wherein adjacent ones of said plurality of gaps are positioned at distinct peripheral positions separated by a predefined angular interval relative to said longitudinal axis.

5. The strain relief boot of claim 4, wherein the predefined angular interval between adjacent ones of said plurality of gaps is about 90 degrees.

6. The strain relief boot of claim 3, wherein each of said plurality of links is annular in shape, with a respective pair of said plurality of ribs extending in opposed positions about the sleeve member between adjacent ones of said plurality of links, ribs on axially opposite sides of each link being positioned at distinct peripheral positions separated by a predefined angular interval.

7. The strain relief boot of claim 6, wherein the predefined angular interval between ribs on axially opposite sides of each link is about 180 degrees.

8. A strain relief boot for a cable connector comprising:
an elongated sleeve member defining a central channel, said central channel extending along a longitudinal axis and being dimensioned to receive a cable, said sleeve member comprising:
  a first plurality of links, each having a first link width, said first plurality of links being separated by a first plurality of gaps, each having a first gap width in a direction of said longitudinal axis; and
  a second plurality of links, each having a second link width, said second plurality of links being separated by a second plurality of gaps, each having a second gap width in the direction of said longitudinal axis;
  said first gap width being greater than said second gap width.

9. The strain relief boot of claim 8, wherein said first plurality of links defines a first zone having a first minimum bend radius, and said second plurality of links defines a second zone having a second minimum bend radius different from said first minimum bend radius.

10. The strain relief boot of claim 8, wherein each of said first and second pluralities of links are one of tapered and flared in a radial direction.

11. The strain relief boot of claim 10, wherein said first gap and said second gap are positioned at distinct peripheral positions separated by a predefined angular interval relative to said longitudinal axis.

12. The strain relief boot of claim 11, wherein the predefined angular interval between said first gap and said second gap is about 90 degrees.

13. The strain relief boot of claim 10, said first and second plurality of links comprising a plurality of ribs, each of said plurality of ribs extending in the direction of said longitudinal axis to connect adjacent ones of said first and second plurality of links, a respective pair of said plurality of ribs extending in opposed positions about the sleeve member between adjacent ones of said first and second plurality of links, ribs on axially opposite sides of each link being positioned at distinct peripheral positions separated by a predefined angular interval.

14. The strain relief boot of claim 13, wherein the predefined angular interval between ribs on axially opposite sides of each link is about 180 degrees.

15. A strain relief boot for a cable connector comprising:
an elongated sleeve member tapered along its length and defining a central channel, said central channel extending along a longitudinal axis and being dimensioned to embrace a fiber optic cable used for transmission of optical signals in a telecommunications application, said sleeve member comprising:
  links separated by a plurality of gaps spaced along a direction of said longitudinal axis;
  a first longitudinal segment of said sleeve comprising a first plurality of links and gaps, each link of said first plurality of links having a first link size and each gap of said the first plurality of gaps having a first gap size to provide a first minimum bend radius; and
  a second longitudinal segment of said sleeve comprising a second plurality of links and gaps, each link of said second plurality of links having a second link size and each gap of said second plurality of gaps having a second gap size to provide a second minimum bend radius different from said first minimum bend radius, said first and second minimum bend radii being defined to avoid signal loss in an optical signal transmitted by an optical fiber of said fiber optic cable, and said first and second link sizes being different from each other and said first and second gap sizes being different from each other.

16. The strain relief boot of claim 15, wherein each minimum bend radius is defined by a corresponding bend radius of said strain relief boot due to abutting of adjacent links of said elongated sleeve member.

17. The strain relief boot of claim 15, wherein each of said plurality of gaps has a respective width in the direction of said longitudinal axis, each gap of said plurality of gaps in said first longitudinal segment having a first width and each gap of said plurality of gaps in said second longitudinal segment having a second width, the first width being greater than the second width.

18. The strain relief boot of claim 15, wherein each of said plurality of links has a respective width in the direction of said longitudinal axis, each link of said plurality of links in said first longitudinal segment having a first width and each link of said plurality of links in said second longitudinal segment having a second width, the first width being greater than the second width.

19. The strain relief boot of claim 15, wherein said plurality of links comprising a plurality of ribs, each of said plurality of ribs extending in the direction of said longitudinal axis to connect adjacent ones of said plurality of links, a respective pair of said plurality of ribs extending in opposed positions about the sleeve member between adjacent ones of said plurality of links, each of said ribs having a length in a circumferential direction of said sleeve member, a first rib of said plurality of ribs having a first length and a second rib of said plurality of ribs having a second length different than said first length.

20. The strain relief boot of claim 19, wherein each of said plurality of ribs has a respective length along a periphery of the sleeve member, a first length of a first of said plurality of ribs being greater than a second length of a second of said plurality of ribs.

21. A strain relief boot for a cable connector comprising:
an elongated sleeve member defining a central channel, said central channel extending along a longitudinal axis and being dimensioned to receive a cable, said sleeve member having:
  a first zone comprising a first plurality of links separated by a first plurality of gaps, said first plurality of links limiting bending of said sleeve member in said first zone to a first minimum bend radius, said first minimum bend radius of said first plurality of links being uniform within said first zone; and
  a second zone comprising a second plurality of links separated by a second plurality of gaps, said second plurality of links limiting bending of said sleeve member in said second zone to a second minimum bend radius different from said first minimum bend radius, said second minimum bend radius of said second plurality of links being uniform within said second zone.

22. The strain relief boot of claim 1, wherein adjacent ones of said plurality of ribs are oriented transversely to one another.

23. The strain relief boot of claim 22, wherein adjacent ones of said plurality of ribs are positioned at distinct peripheral positions separated by a predefined angular interval relative to said longitudinal axis.

24. The strain relief boot of claim 23, wherein the predefined angular interval between adjacent ones of said plurality of ribs is about 90 degrees.

25. The strain relief boot of claim 1, wherein adjacent links of said plurality of links comprise first and second facing surfaces along said longitudinal axis, said facing surfaces being non-parallel.

26. The strain relief boot of claim 25, wherein said first and second facing surfaces are angled away from each other in a radially outward direction of said sleeve.

27. The strain relief boot of claim 26, wherein said relative angle of the first and second facing surfaces is such that said first face of a link will have surface contact with said second face of an adjacent link at a bend limit of said bend limiting portion.

28. The strain relief boot of claim 1, wherein an inner surface of said sleeve member defining said central channel defines a series of arcs in a direction of said longitudinal axis when said bend limiting portion is not bent.

29. The strain relief boot of claim 28, wherein said arcs are configured so that said inner surface defines a smooth arc when said bend limiting portion is bent at a bend limit of said bend limiting portion.

30. The strain relief boot of claim 8, wherein an inner surface of said sleeve member defining said central channel defines a series of arcs in a direction of said longitudinal axis when said bend limiting portion is not bent.

31. The strain relief boot of claim 30, wherein said arcs are configured so that said inner surface defines a smooth arc when said bend limiting portion is bent at a bend limit of said bend limiting portion.

32. The strain relief boot of claim 8 further comprising a plurality of ribs, each of said plurality of ribs extending in the direction of said longitudinal axis and connecting adjacent ones of said plurality of links, each of said ribs having a length in a circumferential direction of said sleeve member, a first rib of said plurality of ribs having a first circumferential length and a second rib of said plurality of ribs having a second circumferential length different than said first length.

\* \* \* \* \*